Patented Feb. 13, 1923.

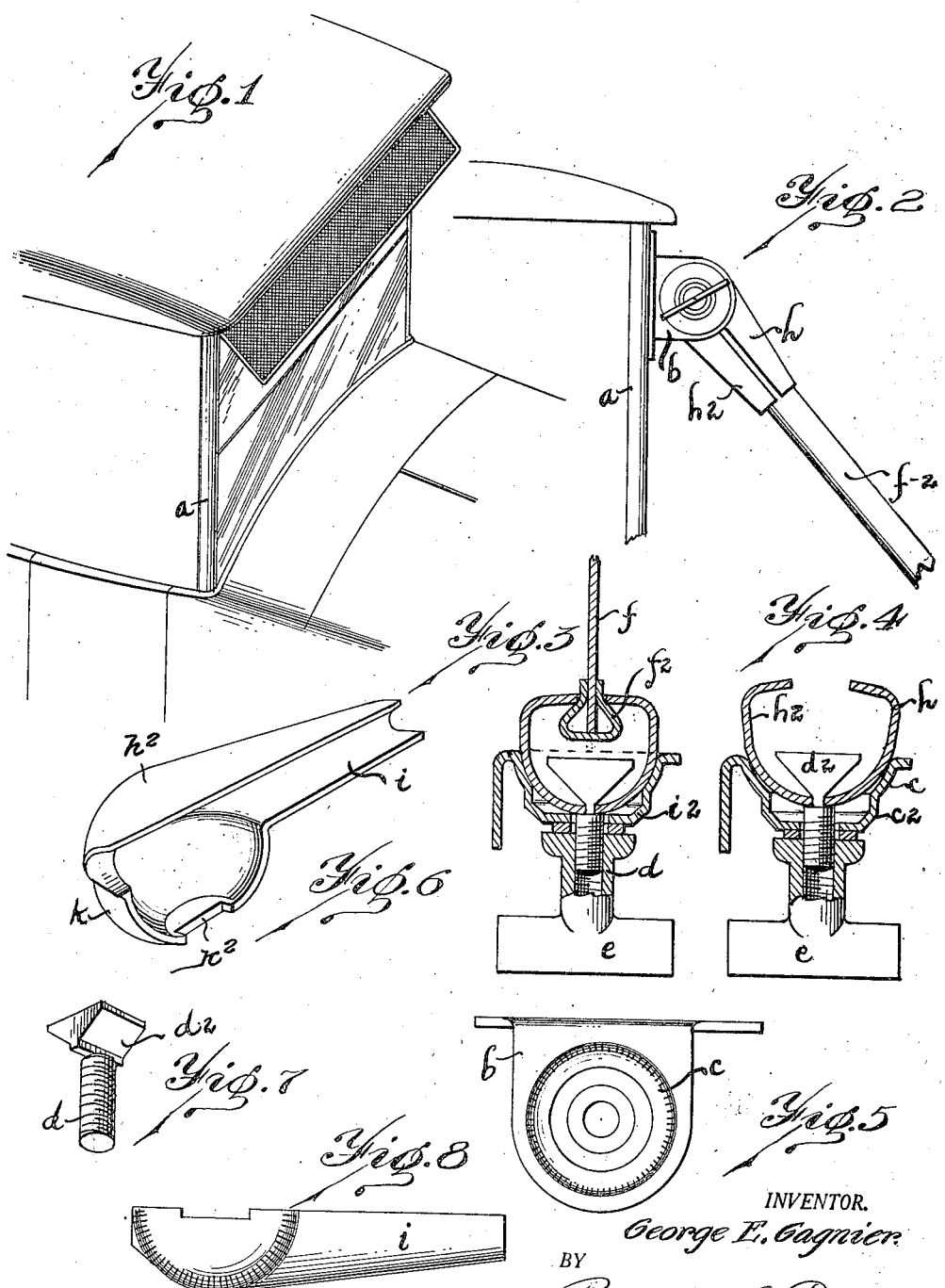

1,444,966

UNITED STATES PATENT OFFICE.

GEORGE E. GAGNIER, OF DETROIT, MICHIGAN.

ADJUSTABLE WINDSHIELD VISOR.

Application filed June 27, 1921. Serial No. 480,647.

*To all whom it may concern:*

Be it known that I, GEORGE E. GAGNIER, a citizen of the United States, residing at Detroit, county of Wayne, State of Michigan, have invented a certain new and useful Improvement in Adjustable Windshield Visors, and declare the following to be a full, clear, and exact description of the same, such as will enable others skilled in the art to which it pertains to make and use the same, reference being had to the accompanying drawings, which form a part of this specification.

My invention relates to an adjustable bracket visor for automobile windshields.

An object of my improvements is to provide simple, inexpensive, easily-adjustable means adapted to secure a windshield protective visor panel at any desired angle relative the windshield.

A further object is to provide, in combination with a stationary bracket carried by the windshield, new and improved means for gripping the visor panel and for securing the same at the desired angle.

In the drawings,—

Figure 1 shows my visor secured to the automobile windshield.

Fig. 2 is an enlarged end view showing the visor partly broken away.

Figs. 3 and 4 are cross-sections in which the gripping members are shown closed and opened respectively.

Fig. 5 is a plan of the stationary bracket.

Fig. 6 is a perspective of one of the gripping members.

Fig. 7 is a perspective of the adjusting bolt.

Fig. 8 is a plan of one of the gripping members.

In the drawings, let $a$ indicate the automobile windshield standards to each of which is secured a stationary bracket member $b$ in any suitable manner, which bracket member is formed with a forwardly-projecting portion in which is provided a concavity $c$, here shown as being corrugated, and in the bottom of which concavity is formed a well $c^2$. The bottom of the well is pierced to permit the passage of the bolt $d$ therethrough. One end of the bolt is provided with a squared beveled head $d^2$ and the other end with a thumb nut $e$.

A windshield visor panel $f$ is provided of any suitable material, the edges of which are bound, as shown, by a binding strip $f^2$ which is adapted to be gripped between the opposite gripping edges of a pair of gripping members $h$ and $h^2$ which are of suitable construction.

These gripping members comprise a channel portion $i$ adapted to embrace one edge of the binding strip $f^2$ and are formed at one end with an outwardly corrugated convex portion $k$ adapted to be received within the concavity in the stationary bracket, which convex portion is cut away as at $k^2$ so as to grip the head $d^2$ of the bolt $d$ where it is beveled, thereby locking the gripping members to such bolt.

In the adjustment of the device, it is obvious that if the nut $e$ is loosened it will permit angular adjustment of the visor relative the supporting standard, or the entire removal of the visor panel from the gripping members. The loosened position of the gripping members is shown in Fig. 4. As the nut is threaded on the bolt the gripping members are drawn downwardly to a seat in the concavity $c$ and they pivot about the edge of the wall of the concavity as the beveled head is drawn downwardly so that the outer gripping edges are forced inwardly to grip the visor panel, as shown in Fig. 3.

This device will, therefore, not only serve to hold the visor firmly against rattle or displacement, but will permit of any desired angular adjustment of the visor, or the removal thereof from the supporting bracket.

What I claim is:

1. In a device of the class described, in combination, a fixed bracket member provided with a concavity, a pair of gripping members provided with portions adapted to be received within such concavity, means adapted to draw such gripping portions to a seat within such concavity in such a manner that the outer gripping edges will be concurrently forced inwardly toward each other.

2. In a device of the class described, in combination, a fixed bracket member provided with a concavity, a pair of cooperating gripping members provided with oppositely-disposed, outwardly-convex portions adapted to be received within said concavity, means adapted to draw such convex portions within said concavity and at the same time cause the gripping members to pivot in such a manner that the outer gripping edges will be brought inwardly toward each other.

3. In a device of the class described, in combination, a stationary bracket member provided with a corrugated concavity, a pair of opposed cooperating gripping members, each provided with an outwardly-corrugated, convex portion adapted to be received within said concavity, a threaded member engaging said convex portions of the gripping members and adapted to draw them inwardly within said concavity and concurrently therewith cause them to pivot on the wall of the concavity in such a manner that the gripping members are brought inwardly toward each other.

4. In a device of the class described, in combination, a stationary bracket member provided with a concavity, a pair of co-operating gripping members, each provided with an outwardly convex portion adapted to be received within said concavity, the convex portions of said co-operating gripping members cut away to permit the insertion of a tapered threaded member between such convex portions, a tapered threaded member received between said convex portions, an adjusting nut on said threaded member adapted when tightened to draw said gripping members to a seat within said concavity and at the same time cause them to rotate about the edge of the wall of the concavity as a pivot in such a manner as to force the outer gripping edges of such member inwardly toward each other.

5. In a device of the class described, in combination, a supporting member having a concavity, a pair of gripping members having convex portions adapted to seat in the concavity in the supporting member, a windshield visor adapted to be held between said gripping members, adjustable means adapted to draw the convex portions of said gripping members to a seat within the concavity of the supporting member at the same time causing the gripping members to engage opposite sides of said windshield visor.

In testimony whereof I sign this specification.

GEORGE E. GAGNIER.